UNITED STATES PATENT OFFICE.

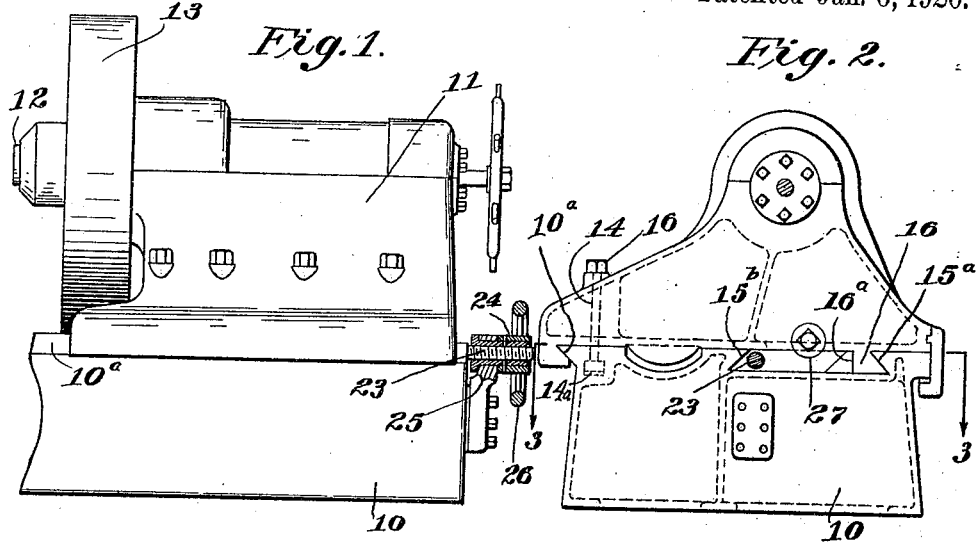
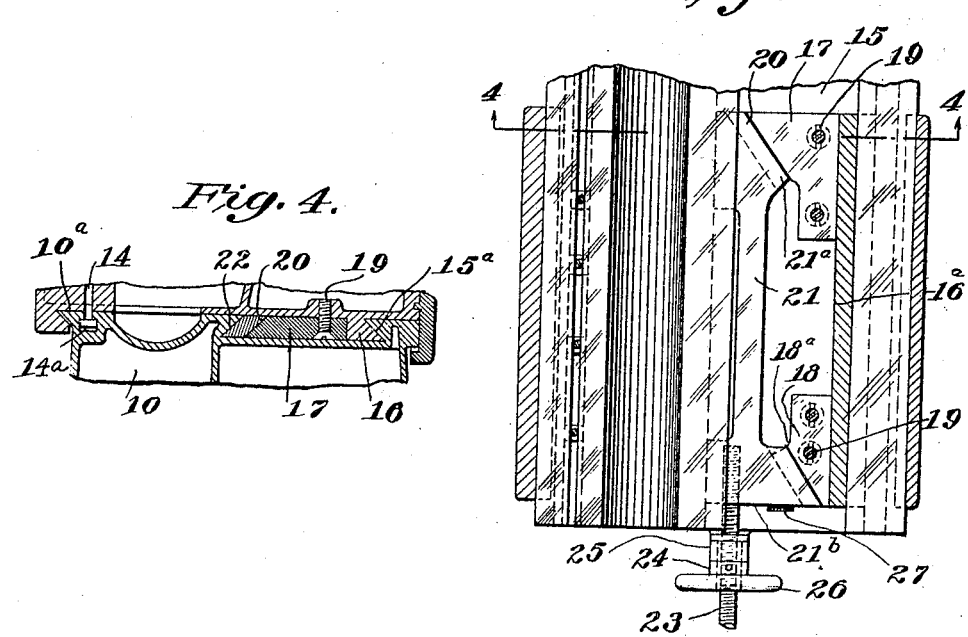

SALMON W. PUTNAM, 3D, OF ROCHESTER, NEW YORK, ASSIGNOR TO ARTHUR H. INGLE, OF ROCHESTER, NEW YORK.

TAILSTOCK-CLAMPING MECHANISM.

1,327,356.   Specification of Letters Patent.   Patented Jan. 6, 1920.

Application filed November 21, 1918. Serial No. 263,597.

*To all whom it may concern:*

Be it known that I, SALMON W. PUTNAM, 3d, a citizen of the United States, and resident of Rochester, county of Monroe, State of New York, have invented an Improvement in Tailstock-Clamping Mechanisms, of which the following description, in connection with the accompanying drawings, is a specification, like characters on the drawings representing like parts in each of the several views.

This invention relates to devices for clamping or binding an adjustable member to a relatively fixed bed or base in any one of a series of adjusted positions and while having other and more general fields of usefulness is well adapted and designed for clamping a center mounting such as a tailstock to the bed in a double tire turning lathe or other mechanism of more or less analogous character where appreciable end thrust or pressure is or may be exerted on the tailstock or like adjustable member in the operation of the machine. In the common type of "open center" tire turning lathes wherein the face plates or driving members are externally disposed with respect to the wheels to be machined, it is customary to engage the wheel to turn the same from the face plate by means of serrated jaw driving dogs which acting against the wheel at an angle, on the principle of the inclined plane exert a multiplied end thrust that is taken up between the headstock and the tailstock, which with the working pressure on the cutting tool approximating sixty tons as demonstrated in practice is resolved into an end thrust against the tailstock of over one hundred twenty-eight tons when using driving dogs having an inclined plane angle of 25°. In lathes of this character, while both the headstock and tailstock may be adjustable along the bed it is customary to fix the headstock permanently and immovably to the bed and provide means for the lateral or endwise movement of the tailstock along the bed for the reception and removal of the work. Under the heavy duty requirements of modern practice and with high speed steels, it was soon found that the clamping of the tailstock by usual forms of T-bolts or the like was inadequate and various forms of tailstock binders have been proposed, which have required a distinct and more or less involved hand operation. In the only automatic clamping device heretofore proposed so far as known to me such clamping device is only adapted for use where the tailstock is moved always to a fixed or constant position on the bed making such device impracticable to meet requirements with varying widths of tires as in the case of locomotive driving wheels which necessitates the clamping of the tailstock in varying positions on the bed according to the width of the tires in hand. The principal object of the present invention is to provide a simple yet efficient and reliable tailstock clamp or binder that is automatically operable to clamp the tailstock rigidly to the bed in any adjusted position thereof within the required range, and with a force superior to the pressure on the cutting tool and always in direct ratio to such pressure. In accordance with my invention I provide a laterally acting binding gib that is adapted to take up the working thrusts and pressures on the tailstock and translate them into a powerful clamping force that is adapted to act laterally between the tailstock and the ways of the bed in a manner so as to lock the tailstock rigidly and strongly to the bed in any adjusted position, and with a force that always increases with an increase in the working thrusts. A further important object is to provide a clamping device that exerts its binding effect substantially at the transverse center of the tail stock and at the working end thereof whereby greater rigidity is obtained and it is possible to employ a tailstock of lighter section than has heretofore been possible. The foregoing and other objects and advantages of the invention will more fully appear from the following detailed description, and the distinctive features of novelty will be pointed out in the appended claims.

Referring to the drawings:

Figure 1 is a partial side elevation showing the tailstock end of a double tire turning lathe equipped with my invention;

Fig. 2 is an end view thereof with certain operating elements in section;

Fig. 3 is a partial horizontal section on line 3—3 of Fig. 2; and

Fig. 4 is a partial transverse section on line 4—4 of Fig. 3.

10 indicates the tailstock end of a lathe bed, to the ways 10ª of which is adjustably fitted a tailstock 11 having a usual work holding center 12, the face plate and its driving gear being shown as covered by a guard 13. I preferably, though not necessarily, equip the tailstock with a series of T-bolts 14 extending downward with their heads engaged in an undercut slot 14ª of the bed and having at their upper ends exposed clamping nuts 16 as usual, these bolts and nuts however not serving in the present case as the primary clamping means, but being tightened in use to a point of sliding adjustment, i. e., with just sufficient hold to permit the tailstock to slide along the bed. That is, in the present case these T-bolts are not intended to be tightened and loosened each time the tailstock is moved but they are preferably kept constantly at a tension permitting the tailstock to slide, and being merely adjusted to take up wear under prolonged service. In accordance with my invention I produce a lengthwise extending slot or recess 15 of substantial width in the top surface of the bed and extending from one side thereof approximately midway of the width of the bed, the sides of this slot presenting undercut walls 15ª, 15ᵇ. The undercut wall 15ª adjacent the side of the bed is engaged by a rib 16 which depends from the tailstock and has its surface engaging the wall 15ª chamfered to fit the same while its inner wall 16ª is as shown vertical and has fitted thereagainst adjacent the ends thereof, blocks 17, 18, which are made fast to, and rendered substantially a part of, the tailstock unit either by being securely fixed to the under surface thereof by screws 19, or as preferably produced in practice they may be cast with, and form an integral part of the tailstock. The blocks 17, 18 have the inner sides thereof inclined at an angle of about thirty-five degrees to the line of the ways of the bed and also beveled off vertically as indicated at 20 for engagement by corresponding surfaces formed at the ends of a binding gib 21 which is slidingly fitted in the recess 15 and has its inner end faces beveled as indicated at 22 to fit the undercut way 15ᵇ. The outer block 18 is preferably of lesser width than the inner block 17 to an extent so that the widest point 21ª of the inner wedge face of the gib 21 may clear past the widest point 18ª of the block 18 to permit assemblage and removal of the parts. The binding gib 21 has fixedly engaged in its outer end a screw stem 23 which extends outward beyond the end of the bed where it is engaged by a nut 24 swiveled in a suitable bearing 25 fixed at the end of the bed. The nut 24 has rigid therewith a wheel 26 which may be either hand or power operated and is shown to typify any suitable operating device for turning said nut, or in a broader sense to obtain a relative movement between the screw and nut, since in a generic aspect it is immaterial whether the screw rotate and the nut be stationary, or vice versa. In use the nut 24 is turned either by hand or power to adjust the tailstock as required. In this movement of the tailstock the inclined faces 20 of the binding gib pressing lengthwise against the wedge blocks 17, 18 will move the tailstock endwise freely, as I have found that with the described angle of thirty-five degrees or thereabout to the direction of lengthwise movement for the engaging parts, there is no tendency to a relative jamming or wedging of the parts transversely, i. e., when the tailstock is free running and the factor of working stress is not involved. Then with the tailstock located in operative position, as the working strains are imposed thereon, the wedge blocks 17, 18 pressing backward against the inclined faces 20 of the binding gib press the same transversely inward and so that the inner faces 22 of said gib are pressed and clamped strongly against the undercut wall 15ᵇ of the bed, the binding gib being at this time prevented from yielding backward by the screw 23 and nut 24 anchored to the bed. By reference to Fig. 4 it will be noted that the forward extremity of the binding gib 21 assumes the definite form of a true gib and with its upwardly tapered face 22 engaging the undercut wall 23 creates a holding down force at the inner or face plate end of the tailstock and where the tendency of the tailstock to lift from the bed is the greatest; also that the binding gib and the operative faces thereof are well inward of the width of the tailstock, in fact approximately midway of the width of the bed and thus the clamping and binding action is exerted in or close to the vertical plane of the tailstock center, and up close under the working area of the tool, thus attaining a maximum of rigidity and strength and requiring materially less mass of metal in the structure of the tailstock. While I show herein the interposed binding gib 21 as presenting two distinct undercut operative surfaces at the ends thereof, it is to be understood that this is merely illustrative and that either a single continuous undercut beveled surface, or any desired plurality of interrupted surfaces might be employed in a broader aspect of the invention, the present showing of two such surfaces being preferred on account of the mechanical limitations of the area within which this binding gib is to be interposed. The angle of incline of these gib faces is selected, having in view the excessive widthwise pressure tending to split or crush the undercut co-acting walls, with the co-acting wedge surfaces presenting a smaller angle to the length of the gib, while with a too great angle, the function and advantage of wedge clamping action is largely lost. For retracting the tailstock as the binding gib is drawn backward by the screw 23, I provide suitable means shown as a clip 27 carried at the outer end of the tailstock and depending into the path of the binding gib so as to be engaged by the outer end thereof, said clip being adjustable to the extent that the co-acting undercut surfaces of gib, tailstock and bed may be kept in contact by elimination of lost motion due to wear on the several sliding surfaces of bed, tailstock and gib. I believe it to be broadly new to provide means whereby a slidingly adjustable element such as the tailstock of the present case is adapted to receive its adjusting movement from the instrumentality which also serves to clamp it, i. e., the wedge gib in the present case. It will be understood that while I show the gib 21 actuated for its operative movement in the present case by a screw, that this is merely illustrative and that other well known mechanical means might be substituted therefor. In this as well as in other respects I am aware that the invention may be embodied in other specific forms without departing from the spirit or essential attributes thereof, and I therefore desire the present embodiment to be considered as illustrative and not restrictive, reference being had to the appended claims rather than to the foregoing description to indicate the scope of the invention.

Having described my invention, what I claim as new and desire to secure by Letters Patent is:

1. Apparatus of the kind described, comprising a bed equipped with ways, a mounting for a tailstock or the like adapted to receive and withstand operative pressure, slidably fitted on said ways, and means constructed and arranged to clamp said mounting to said bed in a selective adjusted position automatically by operative pressure applied to said mounting and with a force proportional to such pressure.

2. Apparatus of the kind described, comprising a bed equipped with ways, a mounting with a binding action exerted in two directions slidably fitted thereon, and means including a transversely movable wedging member for clamping automatically said mounting to said bed in a selective adjusted position by operative pressure applied to said mounting.

3. Apparatus of the kind described, comprising a bed equipped with ways, a mounting slidably adjustable thereon, means for adjusting said mounting along said bed, and means coöperative with said adjusting means for clamping said mounting to said bed in any adjusted position thereon, said means constructed and arranged to be automatically operable by operative pressure applied to said mounting and being proportional in clamping effect to such operative pressure.

4. Apparatus of the kind described, comprising a bed equipped with ways, a mounting slidably fitted thereon, a screw for adjusting said mounting along said bed, and wedging means engaged with said screw and constructed and arranged to be automatically operable by operative pressure applied to said mounting for clamping said mounting to said bed in any adjusted position thereon with a binding action exerted vertically and horizontally.

5. Apparatus of the kind described, comprising a bed equipped with ways, a mounting slidably fitted thereto, means for adjusting said mounting along said bed, and a wedging gib associated with said adjusting means constructed and equipped to clamp automatically said mounting to said bed by operative pressure applied to said mounting with a force proportional to such pressure and with a binding action exerted both vertically and horizontally.

6. Apparatus of the kind described, comprising a bed equipped with ways, a tailstock mounting slidably fitted thereto, a wedging gib associated with said mounting and disposed relatively near the transverse center thereof, and means engaged with said gib for adjusting said mounting along said bed, said gib being equipped with provision for clamping said mounting to said bed in any adjusted position automatically by working pressure applied to said mounting and with a force proportional to such pressure.

7. Apparatus of the kind described, comprising a bed equipped with ways, a tailstock mounting slidably fitted thereto, said bed formed with a lengthwise extending recess with undercut sides, and said mounting having a rib extending into said recess and fitted to one of said under-cut sides, a wedging gib fitted to the other undercut side of said recess and equipped with provision for clamping automatically said mounting to said bed by working pressure applied to said mounting, and a screw and nut adjusting device associated with said gib and adapted to move the same and with it said mounting for adjustment.

8. Apparatus of the kind described, comprising a bed equipped with ways, a tailstock mounting slidably fitted thereon, and a wedging gib having a screw and nut adjusting connection with said bed, said mounting equipped with means coöperative with said gib whereby it is clamped automatically to said bed with a binding force exerted both vertically and horizontally by working pressure applied to said mounting and with a force proportional to such pressure.

9. Apparatus of the kind described, comprising a bed equipped with ways, a tailstock mounting constructed and adapted to receive operative pressure slidably fitted thereon, and means for slidably adjusting said mounting constructed and arranged to serve also as a clamping device for locking said mounting to said bed under operative pressure applied to said mounting and without requiring the actuation of said adjusting means.

10. Apparatus of the kind described, comprising a bed equipped with ways, a tail stock mounting slidably fitted thereon, and means for moving said mounting on said bed having a gib formation arranged to re-act for clamping said mounting to said bed with a binding action both vertically and horizontally under operative pressure applied to said mounting.

11. Apparatus of the kind described, comprising a bed equipped with ways, a tail stock mounting slidably fitted therein, and a wedge gib coöperatively associated with said mounting equipped with operating means and adapted to serve both as an instrumentality for moving said mounting and as a clamping device to lock said mounting to said bed under operative pressure applied to said mounting and without requiring actuation of said operating means.

12. Apparatus of the kind described, comprising a bed equipped with ways, a tail stock mounting slidably fitted thereon, and a gib having an operating device associated therewith, and arranged to serve both as a moving instrumentality and as a locking instrumentality of said mounting with respect to said bed constructed and arranged to exert its binding action both vertically and horizontally.

In testimony whereof, I have signed my name to this specification.

SALMON W. PUTNAM, 3D.